A. R. LYNCH.
AUTOMOBILE PLOW.
APPLICATION FILED SEPT. 17, 1909.
973,678.
Patented Oct. 25, 1910.
2 SHEETS—SHEET 1.
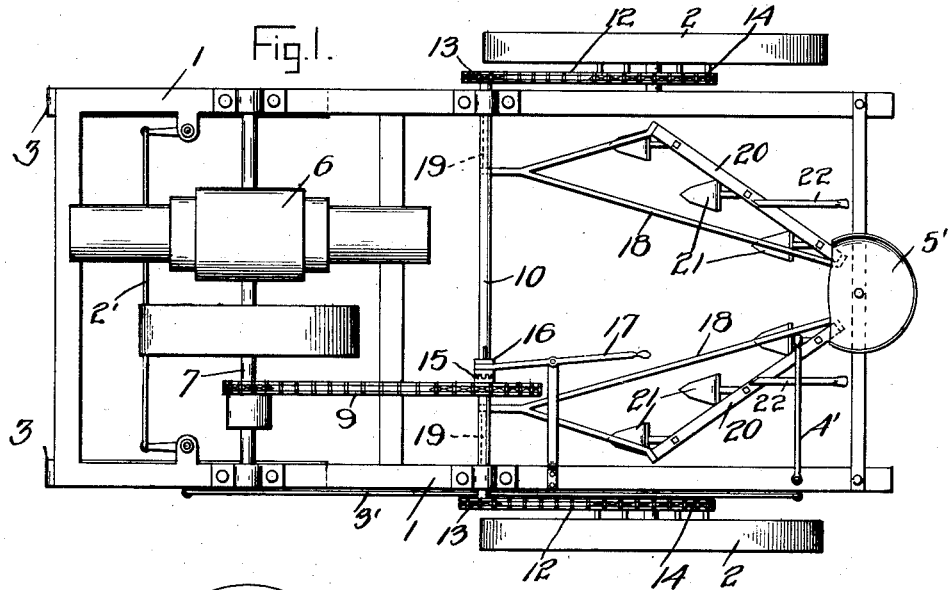
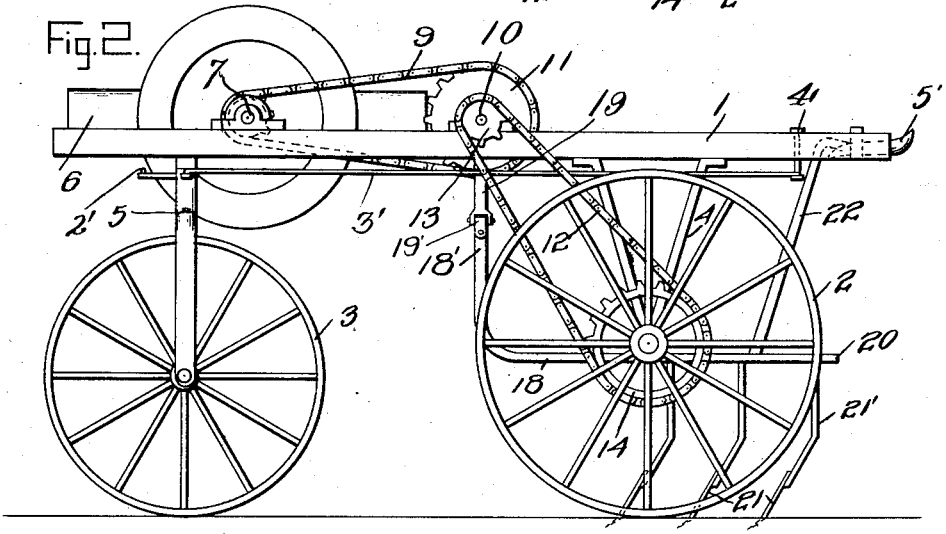
Witnesses
C. K. Reichenbach.
N. H. Byrne
Inventor
Adolphus R. Lynch
By Knight Bros
Attorneys

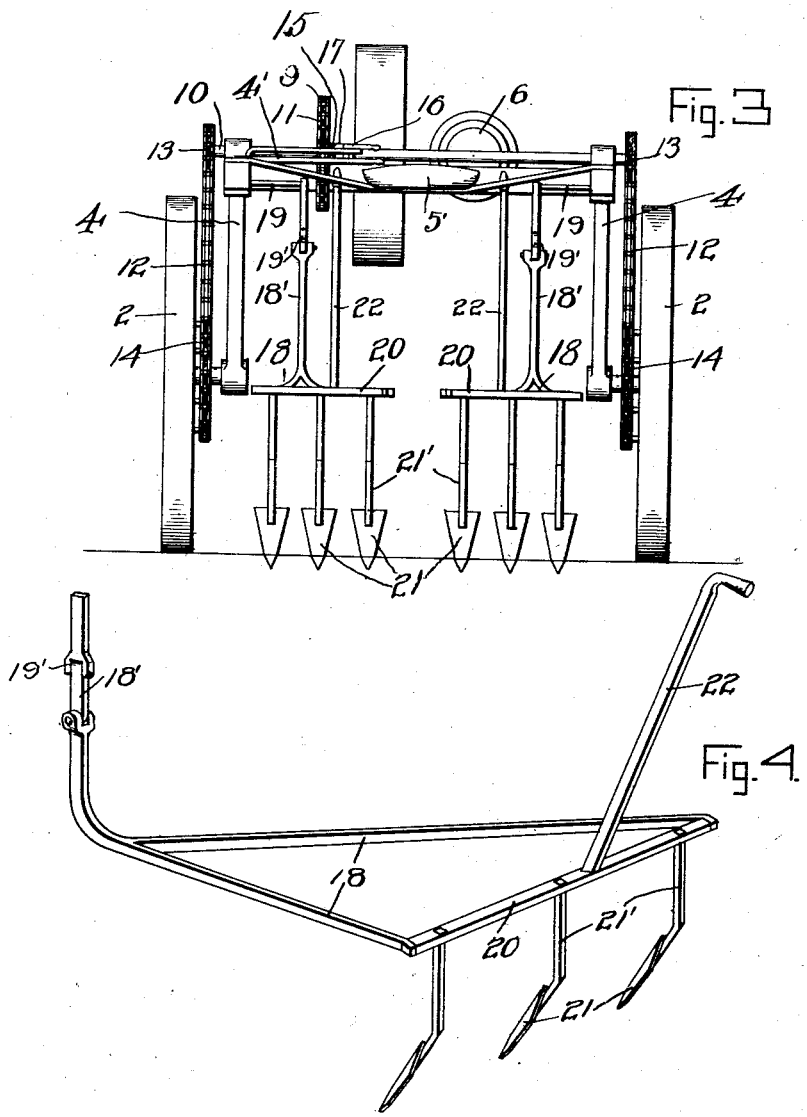

UNITED STATES PATENT OFFICE.

ADOLPHUS R. LYNCH, OF DANVILLE, ILLINOIS.

AUTOMOBILE PLOW.

973,678.  Specification of Letters Patent.  Patented Oct. 25, 1910.

Application filed September 17, 1909. Serial No. 518,226.

*To all whom it may concern:*

Be it known that I, ADOLPHUS R. LYNCH, a citizen of the United States, and resident of Danville, in the county of Vermilion and State of Illinois, have invented certain new and useful Improvements in Automobile Plows, of which the following is a specification.

The present invention relates to plows and particularly to those of the gang type, and has for its purpose to provide a cultivating machine embodying the same and operated through the medium of a motor, preferably of the internal combustion type.

The further purpose of the present invention is to provide a cultivator of the above described character, wherein the gangs of plows are mounted upon two frames whose structure is such that they may be shifted laterally or vertically, whereby to vary their path of cutting in order to avoid obstacles and the like.

Summarily stated, the invention comprises a motor driven vehicle having the necessary power to propel the same, while at the same time carrying the several plow shares through the soil, and is provided with means whereby the same are at all times under the immediate control of the driver.

With the above objects in view, the invention is described in full detail in the following specification and the points of novelty thereof set forth in the appended claim.

In the accompanying drawing which illustrates the preferred embodiment of the cultivator, Figure 1 is a top plan view thereof; Fig. 2 is a side elevation of the same; Fig. 3 is a rear end elevation, and Fig. 4 is a detail view of one of the gang plow frames.

Referring to the several figures more in detail and wherein like characters of reference indicate corresponding parts in the different figures shown, the numeral 1 designates the frame of a vehicle and 2 and 3 the rear and front wheels thereof, respectively. Said frame 1 is suitably supported upon the vehicle wheels by the frames 4 and 5 which support the vehicle frame at a suitable distance above the ground whereby the vehicle may safely travel clear of the plants.

An engine 6, preferably of the internal combustion type, is mounted in the frame to drive the shaft 7, which through the medium of a chain 9 transmits power from the engine to a counter-shaft 10, which in turn transmits power to the rear wheels 2 of the vehicle through the chain and sprocket gearing 12, 13 and 14, as clearly shown in Figs. 1 and 2. The shaft 10 is normally inactive, but derives its movement through the coupling connections 15 and 16, which are controlled by the lever 17 that is within convenient reach of the driver who sits at 5'. Situated in like manner with relation to the seat 5' is a lever 4', which operates suitable steering gear 2' and 3' for the wheels 3, whereby to control the direction of travel of the vehicle.

On each side of the frame 1 and substantially intermediate its length are arranged a pair of inwardly disposed bars 19, to which are connected upwardly disposed arms 18' of two similarly constructed Y frames 18, which carry both sets of gang plows. Each of the frames 18 has a reach bar 20, to which are connected the shanks 21' of the plow shares in precisely that manner shown in Fig. 4. Each of the upright arms 18' is provided with a double hinge 19', by reason of which, and the structure of the plow carrying frames and their manner of mounting on the vehicle said frames may be moved in a lateral or vertical direction whereby the plow shares may be changed from their true path of movement in order to avoid obstacles or the like. And to effect this movement of the plow frames, each of said frames carries an upwardly disposed lever or handle 22 that terminates conveniently within reach of the driver who sits at 5'.

From the foregoing, it will be seen that a cultivating machine has been provided which will perform all the usual work required of such machines by mechanical power alone, as distinct from horse power or the like, and which furthermore may be effectively operated by one man thereby providing a cultivator capable of performing considerably more work and of a better character within a given period, than is the case with cultivators of the type in question now employed.

Having thus described my invention, what I claim as new therein and desire to secure by Letters Patent is:—

A cultivating machine comprising a vehicle, a pair of inwardly disposed members mounted on the frame of the vehicle and having downwardly projecting portions, a pair of Y-frames supporting gang-plows, said Y-frames having each an upwardly disposed part, a double hinge connecting each of said parts with the said downwardly projecting portions, and a lever supported upon each of the Y-frames and serving to permit of vertical or lateral movement of the gangplows, for the purpose set forth.

The foregoing specification signed at Danville, Illinois this seventh day of September, 1909.

ADOLPHUS R. LYNCH.

In presence of—
 JAMES A. MEEKS,
 GRACE D. AUER.